(12) United States Patent
Hsu et al.

(10) Patent No.: US 10,910,627 B2
(45) Date of Patent: Feb. 2, 2021

(54) BATTERY FORMATION SYSTEM AND PROBE SUPPORTING STRUCTURE THEREOF

(71) Applicant: CHROMA ATE INC., Taoyuan (TW)

(72) Inventors: Hsu-Chang Hsu, Taoyuan (TW);
Kuo-Yen Hsu, Taoyuan (TW);
Kuan-Chen Chen, Taoyuan (TW);
Chuan-Tse Lin, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 175 days.

(21) Appl. No.: 16/156,111

(22) Filed: Oct. 10, 2018

(65) Prior Publication Data
US 2019/0123335 A1 Apr. 25, 2019

(30) Foreign Application Priority Data
Oct. 25, 2017 (TW) .............................. 106136757 A

(51) Int. Cl.
| | |
|---|---|
| *H01M 4/04* | (2006.01) |
| *H01M 10/44* | (2006.01) |
| *H01M 10/6563* | (2014.01) |
| *H01M 10/613* | (2014.01) |
| *H01M 10/48* | (2006.01) |
| *H01M 10/647* | (2014.01) |
| *H01M 10/6566* | (2014.01) |
| *H01M 10/6556* | (2014.01) |
| *H01M 10/04* | (2006.01) |
| *H01M 10/42* | (2006.01) |
| *H01M 2/10* | (2006.01) |

(52) U.S. Cl.
CPC ....... *H01M 4/0445* (2013.01); *H01M 4/0447* (2013.01); *H01M 10/049* (2013.01); *H01M 10/425* (2013.01); *H01M 10/441* (2013.01); *H01M 10/446* (2013.01); *H01M 10/482* (2013.01); *H01M 10/486* (2013.01); *H01M 10/613* (2015.04); *H01M 10/647* (2015.04); *H01M 10/6556* (2015.04); *H01M 10/6563* (2015.04); *H01M 10/6566* (2015.04); *H01M 2/1077* (2013.01)

(58) Field of Classification Search
CPC ...................... H01M 10/6566; H01M 10/6556
See application file for complete search history.

(56) References Cited

U.S. PATENT DOCUMENTS

2014/0038004 A1* 2/2014 Didra ...................... G01L 9/007
429/56

* cited by examiner

*Primary Examiner* — Ladan Mohaddes
(74) *Attorney, Agent, or Firm* — Locke Lord LLP; Tim Tingkang Xia, Esq.

(57) ABSTRACT

The disclosure is related to a battery formation system and probe supporting structure thereof. The battery formation system includes a base, a holder, a probe supporting structure and at least one probe. The base is adaptive to bear at least one battery, and the holder is located on one side of the base. The probe supporting structure is disposed on the holder. The probe supporting structure has an air flow passage and at least one air discharge channel connected to each other, and an extension direction of the air flow passage intersects an extension direction of the at least one air discharge channel. The at least one probe is disposed on the probe supporting structure, and a probing end of the at least one probe and an air outlet of the at least one air discharge channel are located at a same side of the probe supporting structure.

8 Claims, 11 Drawing Sheets

BATTERY FORMATION SYSTEM AND PROBE SUPPORTING STRUCTURE THEREOF

CROSS-REFERENCE TO RELATED APPLICATIONS

This non-provisional application claims priority under 35 U.S.C. § 119(a) on Patent Application No(s). 106136757 filed in Taiwan, R.O.C. on Oct. 25, 2017, the entire contents of which are hereby incorporated by reference.

TECHNICAL FIELD

The disclosure relates to a battery activation system, more particularly a battery formation system and a probe supporting structure thereof.

BACKGROUND

Battery is a device capable of transferring and storing energy. It is able to transfer chemical energy or physical energy into electronic energy. Thus, battery is a chemical energy source. The battery has a positive electrode and a negative electrode which are made of different materials, and the two electrodes are immersed in an electrolyte solution which is able to transmit mediums. When the positive and negative electrodes are connected to an outer device, it can offer electronic energy by transferring inner chemical energy. However, after the manufacturing of battery was done, the chemical or physical properties of the electrodes are not in the best state. Therefore, it requires to active the electrodes by charging and discharging them so as to improve the performance such as charging, discharging, self-discharging or energy storing. The process of activating the electrodes is called "formation".

Generally, a battery formation system is consisted of a base for holding the batteries, positive and negative electrode probes, a probe supporting structure for bearing the probes, a temperature detector and a negative pressure module. During the charging/discharging process, the batteries, the probe and the electrodes of the batteries will generate heat. Thus, there is a fan disposed near the battery formation system for heat dissipation.

SUMMARY

One embodiment of the disclosure provides a battery formation system and probe supporting structure thereof. The battery formation system includes a base, a holder, a probe supporting structure and at least one probe. The base is adaptive to bear at least one battery, and the holder is located on one side of the base. The probe supporting structure is disposed on the holder. The probe supporting structure has an air flow passage and at least one air discharge channel connected to each other, and an extension direction of the air flow passage intersects an extension direction of the at least one air discharge channel. The at least one probe is disposed on the probe supporting structure, and a probing end of the at least one probe and an air outlet of the at least one air discharge channel are located at a same side of the probe supporting structure.

One embodiment of the disclosure provides a probe supporting structure for battery formation. The probe supporting structure has an air flow passage and at least one air discharge channel which are connected to each other. An extension direction of the air flow passage intersects an extension direction of the air discharge channel. The air flow passage is configured for gas to flow to the at least one air discharge channel, and an air outlet of the at least one air discharge channel is configured for the gas to be discharged from the probe supporting structure for cooling at least one battery to be formed.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1A:
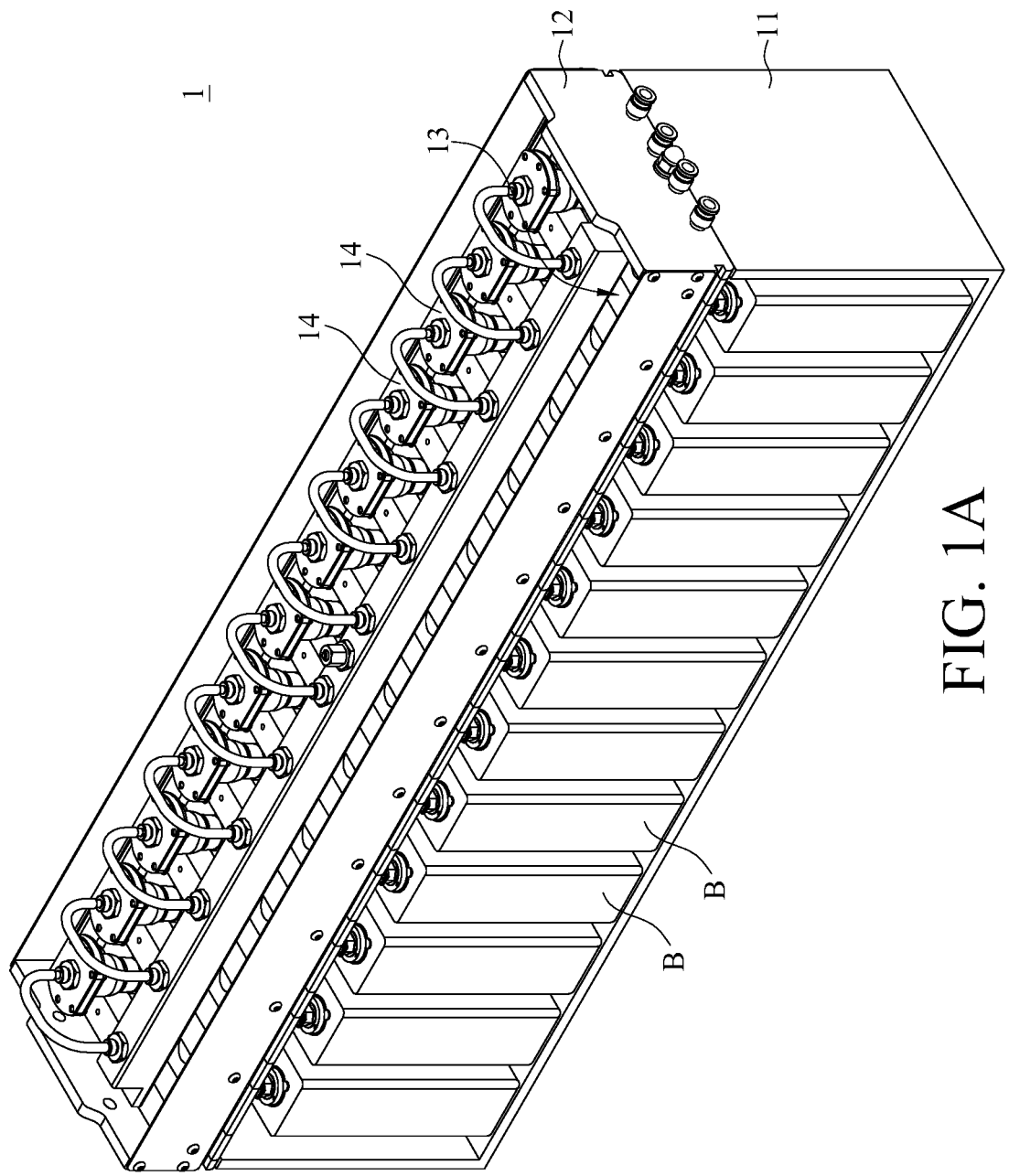
FIG. 1A is a perspective view of a battery formation system according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
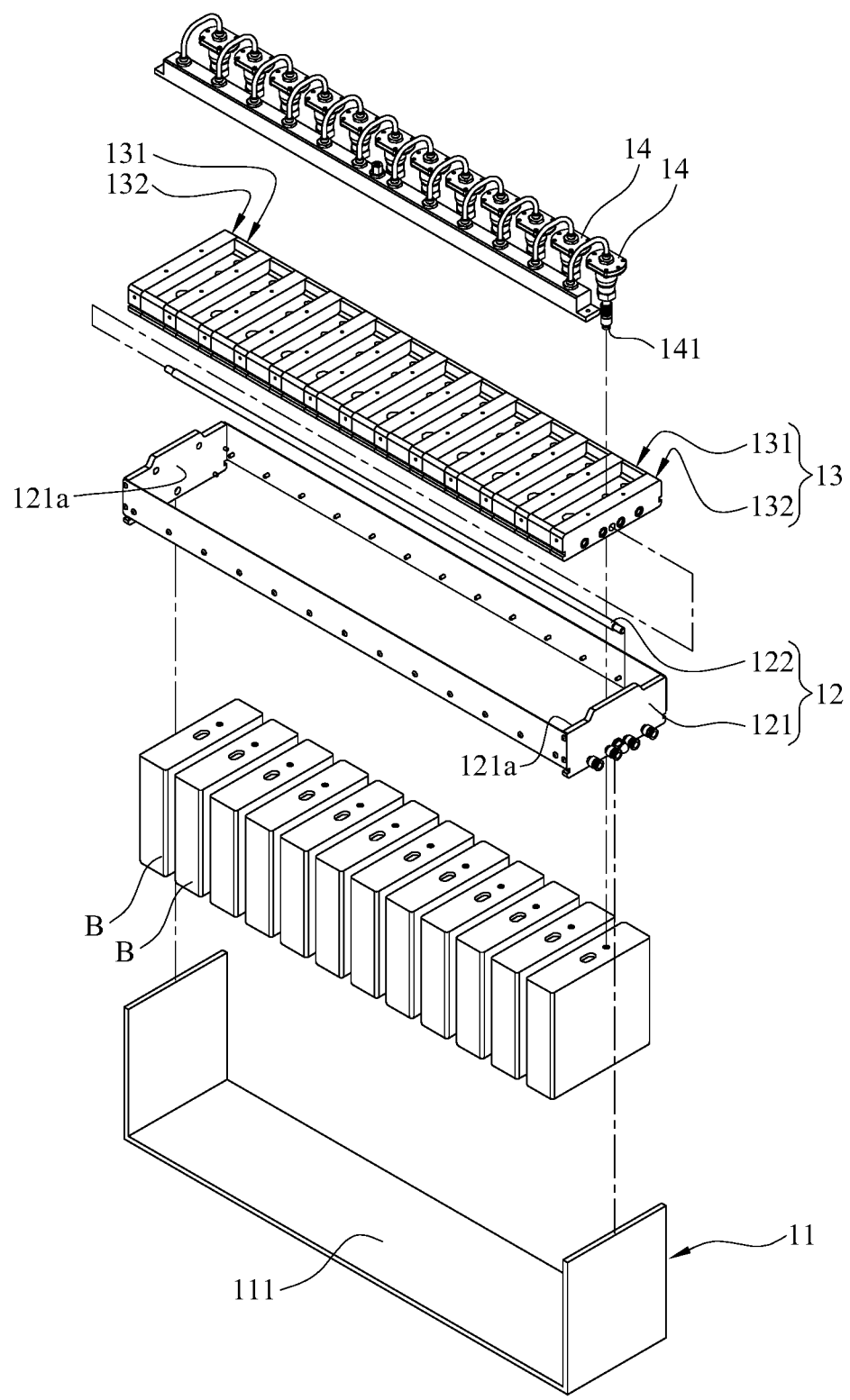
FIG. 1B is an exploded view of the battery formation system in FIG. 1A.

Please refer to FIG. 1A and FIG. 1B. FIG. 1A is a perspective view of a battery formation system according to a first embodiment of the disclosure. FIG. 1B is an exploded view of the battery formation system in FIG. 1A. This embodiment provides a battery formation system 1. The battery formation system 1 includes a base 11, a holder 12 a probe supporting structure 13 and a plurality of probes 14. It is noted that the present disclosure is not limited to the amount of the probes 14. In addition, FIGS. 1A and 1B also show a plurality of batteries to be formed B (also called battery B or batteries B).

The base 11 is, for example, a plastic tray. The base 11 has a bearing surface 111 on its bottom. The base 11 further has a plurality of positioning slots (not shown) formed on the bearing surface 111. The batteries B can be placed on the bearing surface 111 by being disposed at these positioning slots. In this embodiment, the batteries B are square lithium batteries with hard coat.

The holder 12 is locates on a side of the base 11. In this embodiment, the holder 12 is a frame structure and includes a frame body 121 and a guiding bar 122. The frame body 121 is disposed on the base 11 and has two inner surfaces 121a which are opposite to each other. The guiding bar 122 is disposed on the frame body 121 and extends from one of the inner surface 121a to the other inner surface 121a. Two opposite ends of the guiding bar 122 are respectively fixed on the two inner surfaces 121a.

Figure 1C:
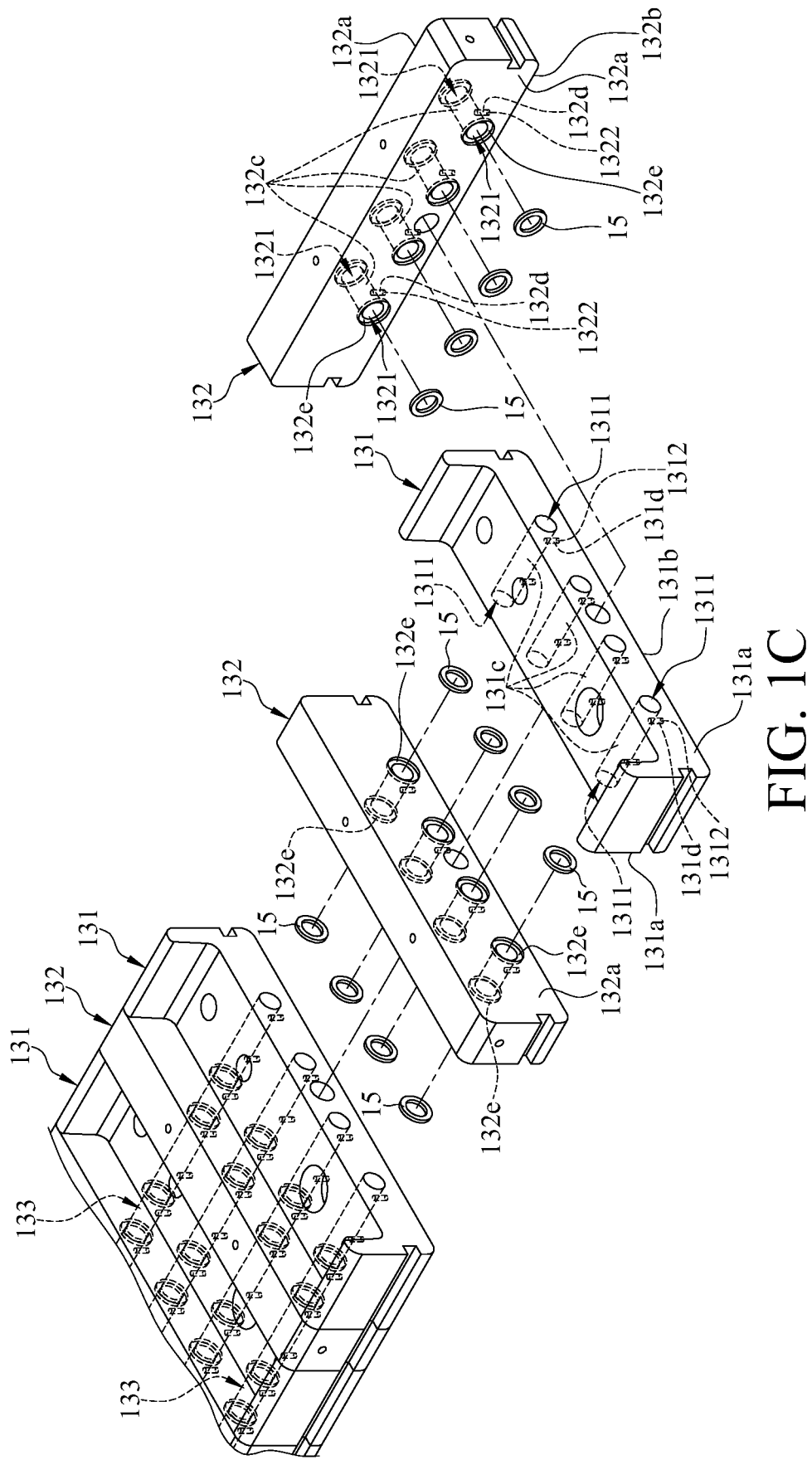
FIG. 1C is a partial exploded view of a probe supporting structure of the battery formation system in FIG. 1B.
Figure 1D:
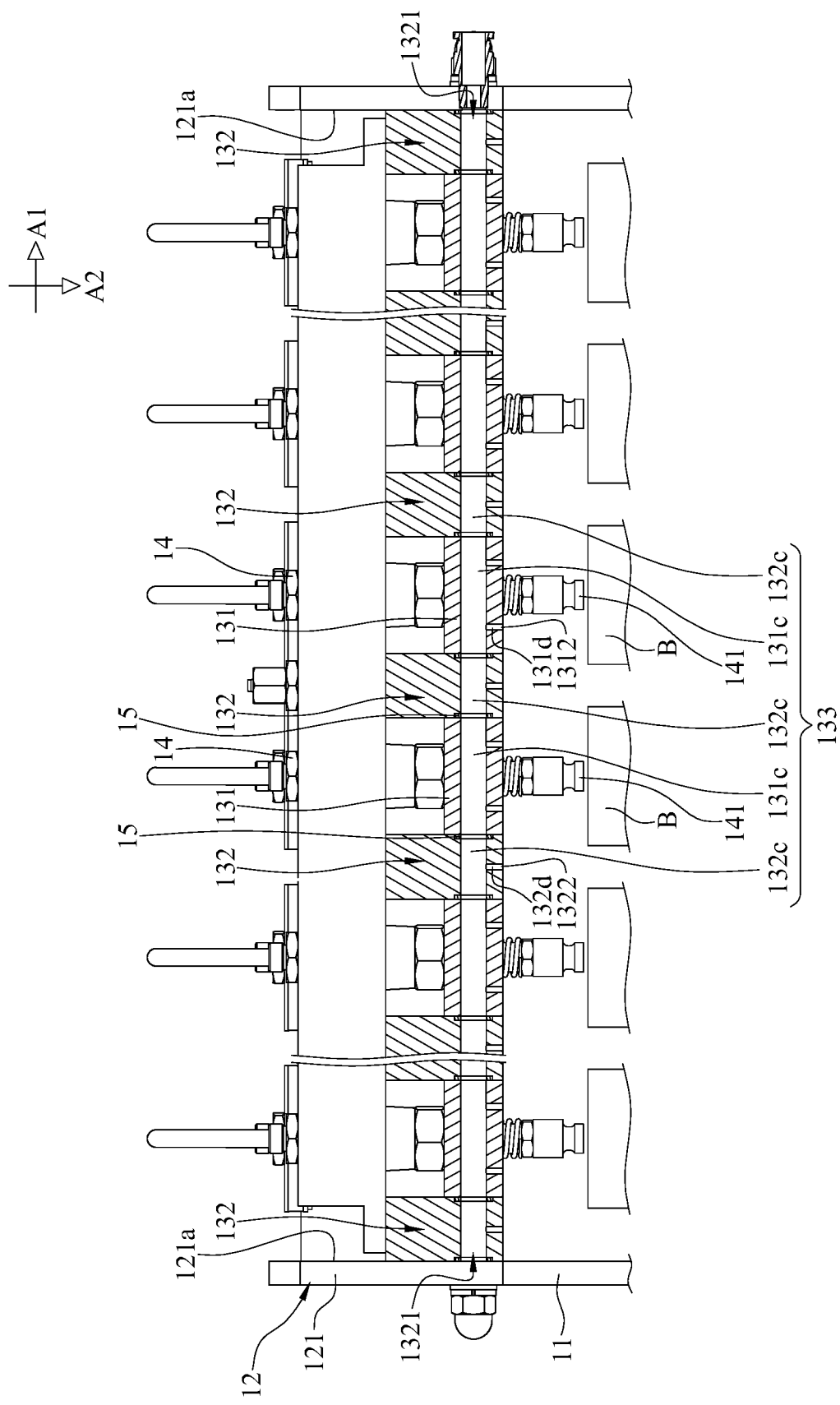
FIG. 1D is a cross-sectional view of the battery formation system in FIG. 1A.

The probe supporting structure 13 is disposed on the holder 12 and includes a plurality of pieces. Please refer to FIG. 1C and FIG. 1D. FIG. 1C is a partial exploded view of a probe supporting structure of the battery formation system in FIG. 1B. FIG. 1D is a cross-sectional view of the battery formation system in FIG. 1A. In this embodiment, the pieces of the probe supporting structure 13 include a plurality of connecting pieces 131 and a plurality of partitioning pieces 132 which are arranged in a staggered manner.

The connecting pieces 131 and the batteries B may be the same in amount, and the amount of the connecting pieces 131 can be adjusted according to the amount of the batteries B. The guiding bar 122 runs through the connecting pieces 131 and the partitioning pieces 132, such that the connecting pieces 131 and the partitioning pieces 132 are disposed on the holder 12 via the guiding bar 122. However, the guiding bar 122 is optional. In other embodiments, the holder may have no guiding bar, and two opposite ends of the connecting pieces and partitioning pieces may be respectively disposed in two grooves on inner walls of the frame body.

Each connecting piece 131 has two opposite side surfaces 131a respectively, a bottom surface 131b, a plurality of channel segments 131c and a plurality of air discharge channels 131d. The bottom surface 131b is located between the two side surfaces 131a. Each channel segment 131c has two vents 1311 respectively located on the two side surfaces 131a. Each air discharge channel 131d has an air outlet 1312 located on the bottom surface 131b. The connection between the channel segment 131c and the air discharge channel 131d is located between the two vents 1311. It is noted that the present disclosure is not limited to the amounts of the channel segments 131c and the air discharge channels 131d and the locations of the air discharge channels 131d.

Similarly, each partitioning piece 132 has two opposite side surfaces 132a, a bottom surface 132b, a plurality of channel segments 132c and a plurality of air discharge channels 132d. The bottom surface 132b is located between the two side surfaces 132a. Each channel segment 132c has two vents 1321 respectively locate on the two side surfaces 132a. Each air discharge channel 132d has an air outlet 1322 located on the bottom surface 132b. The connection between the channel segment 132c and the air discharge channel 132d is located between the two vents 1321. It is noted that the present disclosure is not limited to the amounts of the channel segments 132c and the air discharge channels 132d and the positions of the air discharge channels 132d.

As shown in FIG. 1C and FIG. 1D, when the connecting pieces 131 and the partitioning pieces 132 are disposed on the holder 12, the channel segments 131c and 132c are connected via the vents 1311 and 1321, such that all of the channel segments 131c and 132c are connected so as to form an air flow passage 133. The air flow passage 133 extends in an extension direction A1 (parallels to extension directions of the channel segments 131c and 132c), each of the air discharge channels 131d and 132d extends in an extension direction A2, and the extension direction A1 intersects the extension direction A2. In this embodiment, one of the vents 1321 of two of the partitioning pieces 132 which are respectively nearest to the inner surfaces 121a of the frame body 121 is served as an air inlet of the air flow passage 133. In other embodiments, the connecting pieces 131 may be nearest to the inner surfaces 121a of frame body 121; in such a case, the vent 1311 of one of the connecting pieces 131 may be served as the air inlet of the air flow passage 133. However, the present disclosure is not limited to the above configuration. For example, in some other embodiments, a part of the connecting pieces and a part of partitioning pieces may have no air discharge channel; in another embodiment, each connecting piece may have the air discharge channel, but all of the partitioning pieces may have no air discharge channel; in yet another embodiment, each partitioning piece may have the air discharge channel, but all of the connecting piece may have no air discharge channel.

The probes 14 are, for example, electrode probes or temperature detector probes. The probes 14 are respectively disposed at the connecting pieces 131 of the probe supporting structure 13. Each of the probes 14 has a probing end 141. The probes 14 run through the connecting pieces 131 of the probe supporting structure 13. When the probes 14 run through the connecting pieces 131, the air outlets 1312 and 1322 of the air discharge channels 131d and 132d and the probing ends 141 are located at the same side of the probe supporting structure 13, and the probing ends 141 are able to contact electrodes or temperature detecting gaskets of the batteries B.

As shown in FIG. 1D, in this embodiment, cooling gas such as air or nitrogen gas can be guided into the air flow passage 133 via the air inlet (i.e., the vent 1321 of the leftmost or the rightmost partitioning piece 132) of the air flow passage 133, and the cooling gas can be discharged via the air outlets 1312 of the air discharge channels 131d or the air outlets 1322 of the air discharge channels 132d. The cooling gas discharged from the air discharge channels 131d and 132d can be used to cool the probes 14 and the batteries B. Specifically, because the air flow passage 133 and the air discharge channels 131d and 132d are on the probe supporting structure 13 and the positions of the air outlets 1312 and 1322 are corresponding to the probing ends 141 of the probes 14, the electrodes of the batteries B or the gaps among adjacent batteries B, ambient gas can be guided into the air flow passage 133 and then be discharged from the air outlets 1312 and 1322 so as to uniformly cooling the probes 14 and the batteries B, and thereby improving heat dissipating efficiency.

Furthermore, as shown in FIG. 1C, to prevent the gap from forming between the adjacent connecting piece 131 and partitioning piece 132 to cause gas leakage, the battery formation system 1 further includes a plurality of sealing rings 15. Specifically, each partitioning piece 132 further has two annular grooves 132e, and the two annular grooves 132e respectively surround the two vents 1321. The sealing rings 15 are respectively disposed in the annular grooves 132e. The connecting pieces 131 and the partitioning pieces 132 compress the sealing rings 15 when they are assembled on the holder 12.

Figure 2:
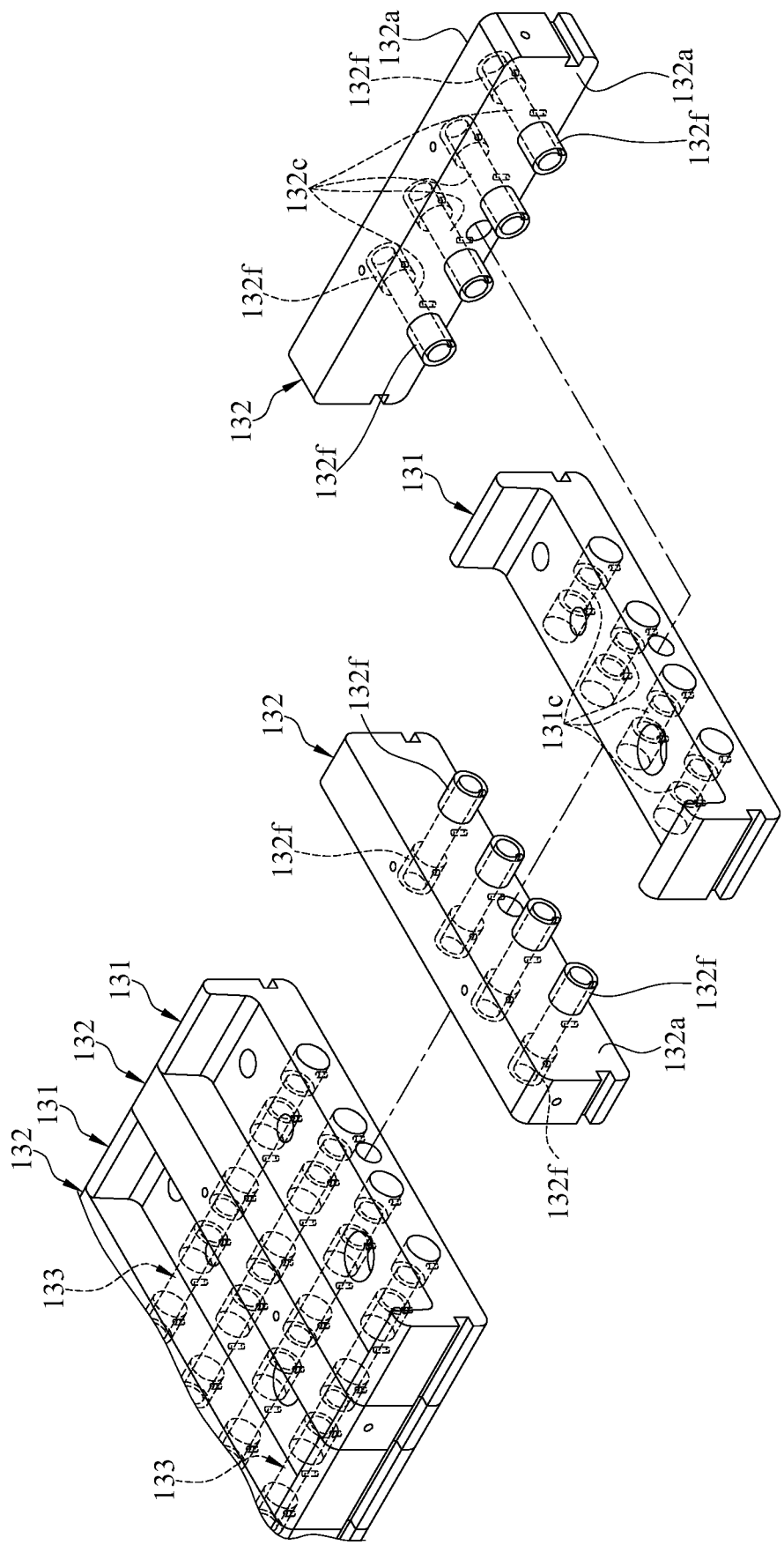
FIG. 2 is a partial exploded view of a probe supporting structure according to a second embodiment of the disclosure.

However, the present disclosure is not limited to the sealing rings 15. Please refer to FIG. 2. FIG. 2 is a partial exploded view of a probe supporting structure of a battery formation system according to a second embodiment of the disclosure. Since the second embodiment is similar to the first embodiment, only the difference between these two embodiments is described below.

As shown in FIG. 2, the partitioning pieces 132 do not have the annular grooves, each partitioning piece 132 has two protruding portions 132f respectively protruding from the two side surfaces 132a and respectively inserted into the channel segments 131c of the two adjacent connecting pieces 131. As such, the protruding portions 132f help to prevent gaps from forming between the connecting pieces 131 and the partitioning pieces 132 so as to prevent gas in the air flow passage 133 from leaking.

Figure 3A:
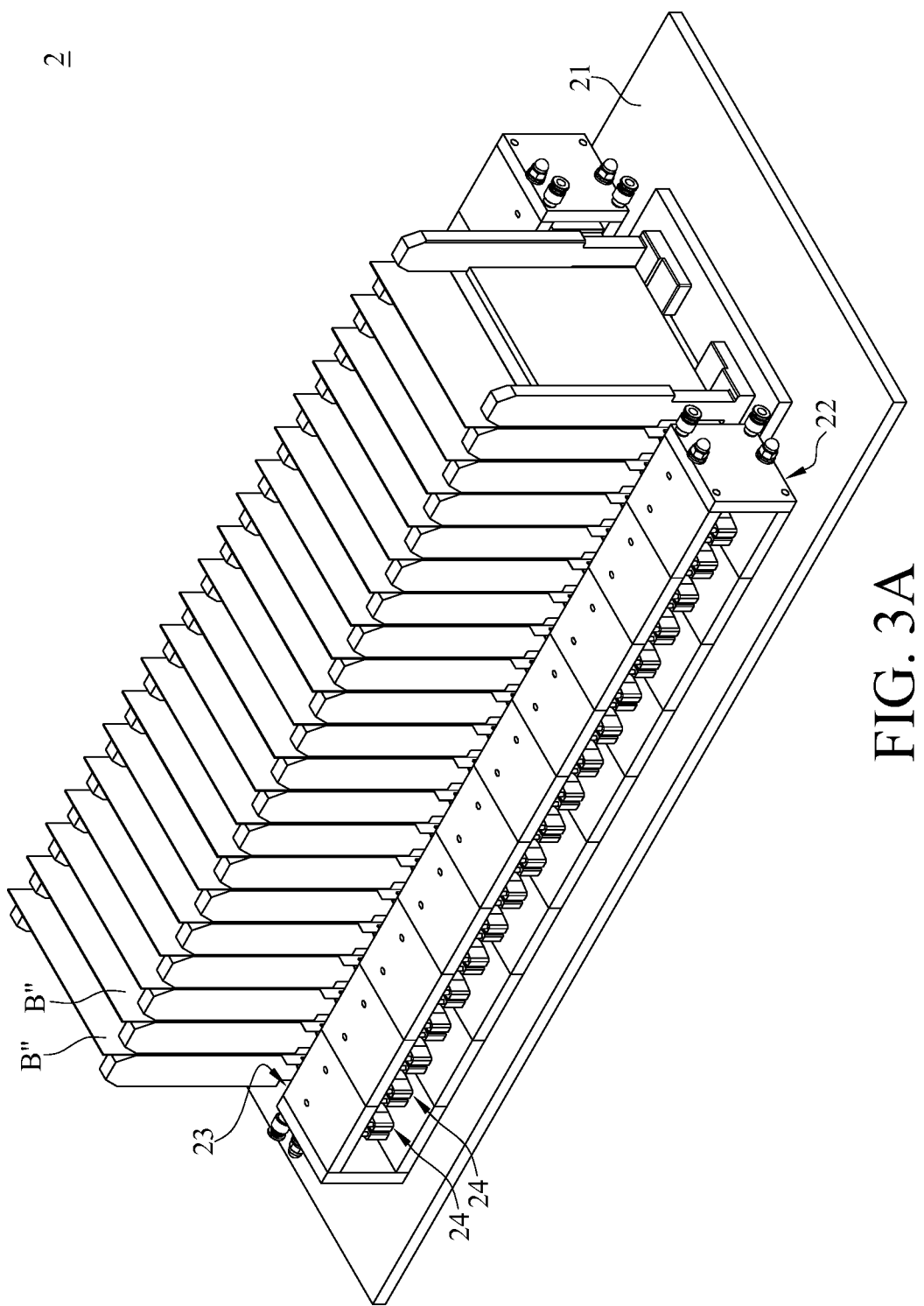
FIG. 3A is a perspective view of a battery formation system according to a third embodiment of the disclosure.
Figure 3B:
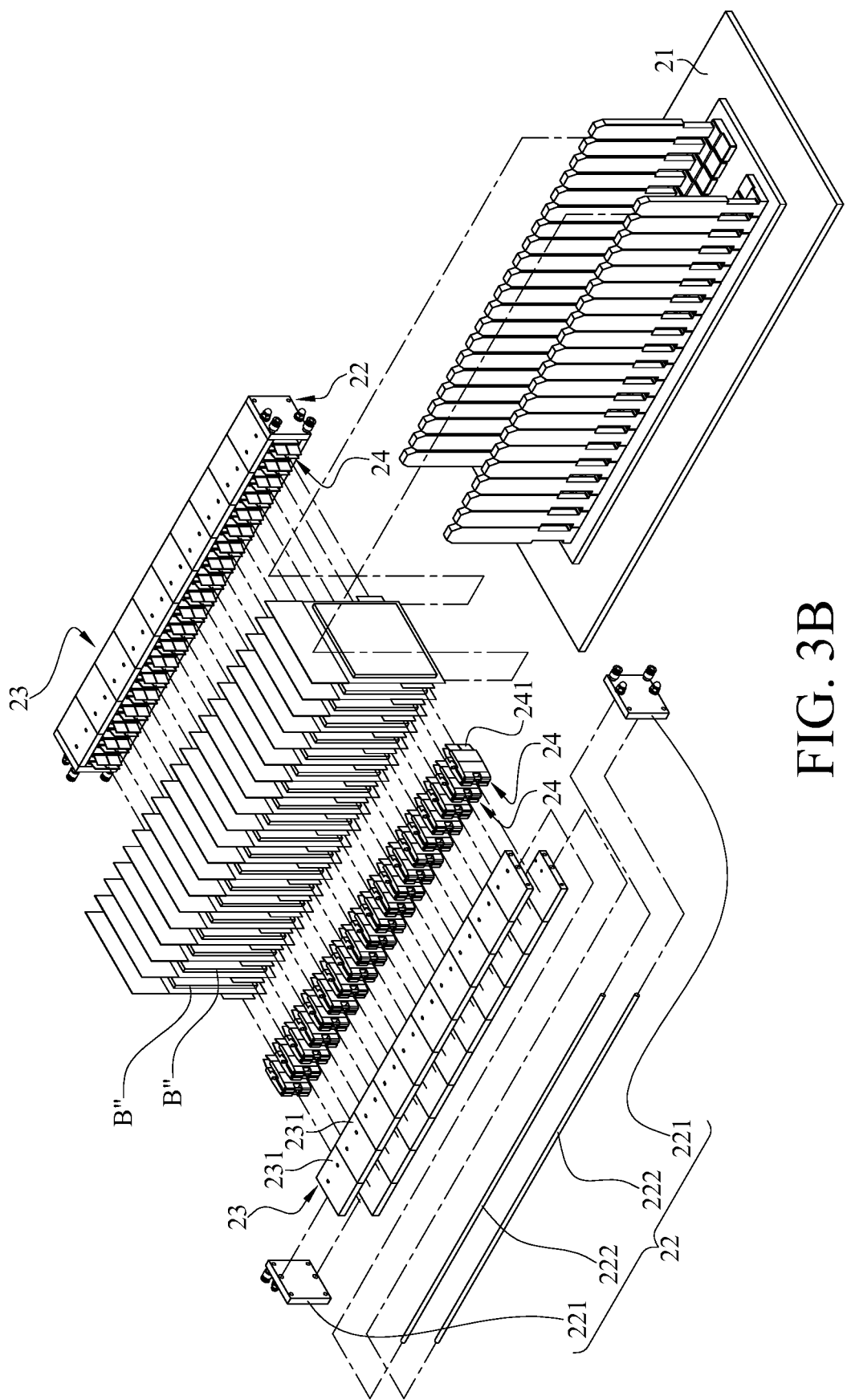
FIG. 3B is an exploded view of the battery formation system in FIG. 3A.

Furthermore, the battery formation system in the first embodiment is adaptive to the batteries with hard coat, but the present disclosure is not limited thereto. Please refer to FIG. 3A and FIG. 3B. FIG. 3A is a perspective view of a battery formation system according to a third embodiment of the disclosure. FIG. 3B is an exploded view of the battery formation system in FIG. 3A. The third embodiment provides a battery formation system 2, the battery formation system 2 includes a base 21, a holder 22, a probe supporting structure 23 and a plurality of probes 24. It is noted that the present disclosure is not limited to the amount of the probes 24.

The base 21 is made of, for example, plastic, and the batteries B" can be disposed on the base 21. In this embodiment, the batteries B" are lithium batteries with soft coat.

The holder 22 is located on a side of the base 21. In this embodiment, the holder 22 includes two supporting plates 221 which are separated from each other and two guiding bars 222. The guiding bars 222 are disposed between the two supporting plates 221, and two opposite ends of the guiding bars 222 are respectively fixed on the two supporting plates 221.

Figure 3C:
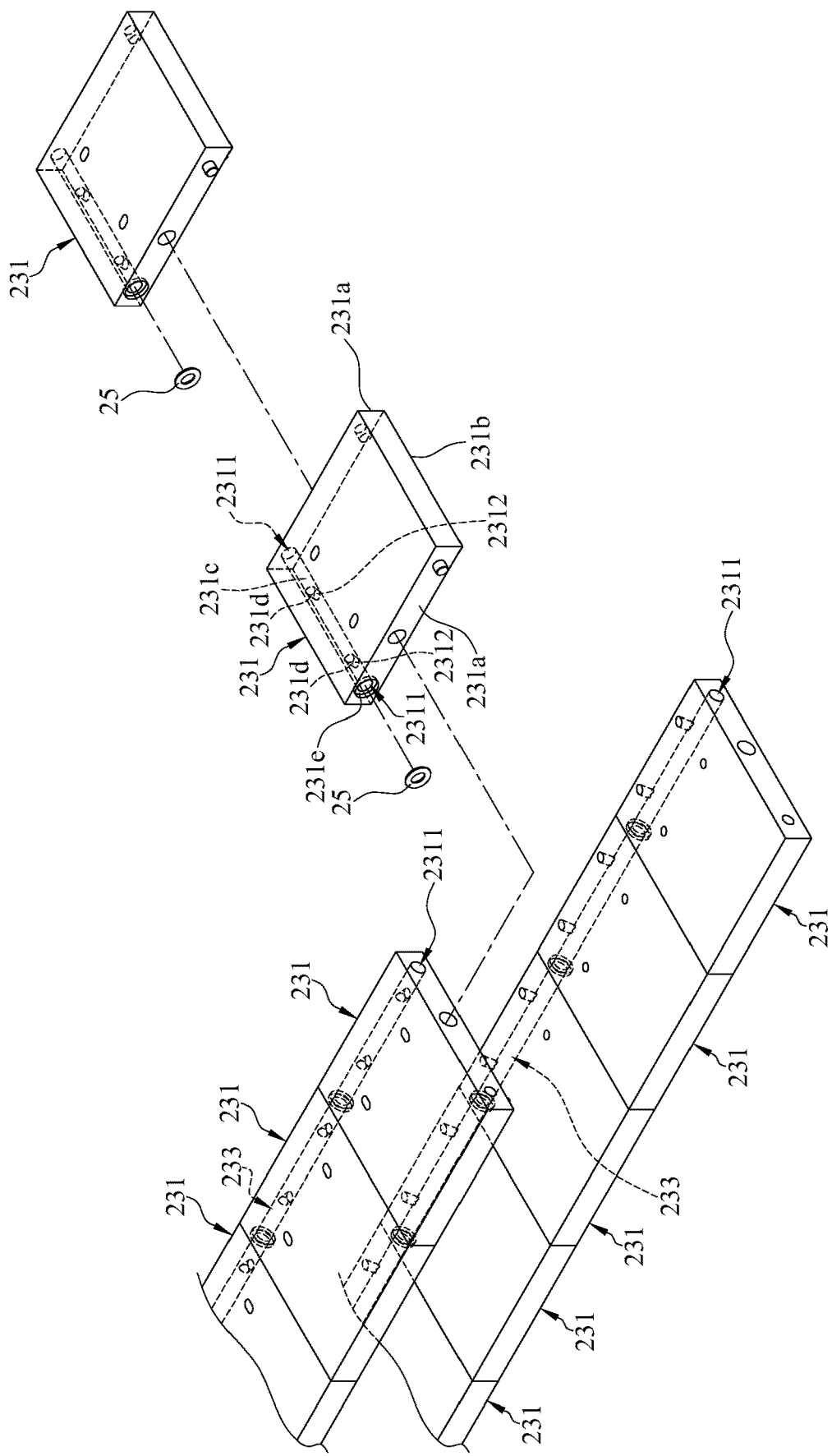
FIG. 3C is a partial exploded view of a probe supporting structure of the battery formation system in FIG. 3B.
Figure 3D:
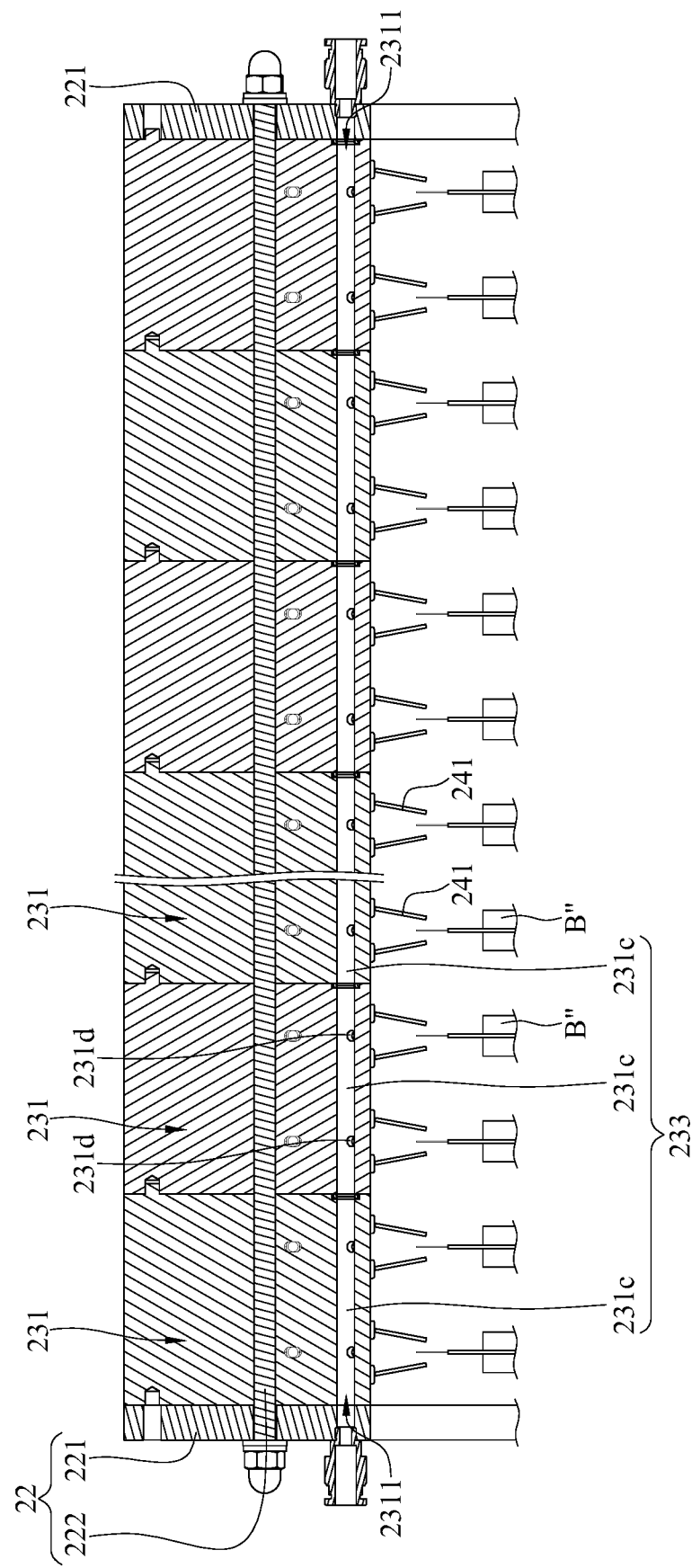
FIG. 3D is a cross-sectional view of the battery formation system in FIG. 3A.

The probe supporting structure 23 is disposed on the holder 22. Please refer to FIG. 3C and FIG. 3D. FIG. 3C is a partial exploded view of a probe supporting structure of the battery formation system in FIG. 3B. FIG. 3D is a cross-sectional view of the battery formation system in FIG. 3A. In this embodiment, the probe supporting structure 23 includes a plurality of pieces 231, and the guiding bars 222 run through the pieces 231, such that the pieces 231 are disposed between the two supporting plates 221 of the holder 22.

Each piece 231 has two opposite side surfaces 231a, a bottom surface 231b, a channel segment 231c and an air discharge channel 231d. In each pieces, the bottom surface 231b is located between the two side surfaces 231a. The channel segment 231c has two vents 2311 respectively located on the two side surfaces 231a, and the air discharge channel 231d has an air outlet 2312 located on the bottom surface 231b. The connection of the channel segment 231c and the air discharge channel 231d is located between the two vents 2311. It is noted that the disclosure is not limited to the amount and the location of the air discharge channels 231d.

As shown in FIG. 3C and FIG. 3D, as the pieces 231 are disposed on the holder 12, the channel segments 231c are connected via the vents 2311, and all of the channel segments 231c are connected so as to form an air flow passage 233. The air flow passage 233 has an extension direction (parallels to an extension direction of the channel segment 231c), and the air discharge channel 231d has an extension direction which intersects the extension direction of the air flow passage 233. In this embodiment, the vent 2311 of one of the pieces 231 that is nearest to the supporting plates 221 is served as an air inlet of the air flow passage 233. In addition, in this embodiment, each piece 231 has the air discharge channel 231d, but the disclosure is not limited thereto. In other embodiments, only a part of the pieces have the air discharge channel.

The probes 24 are, for example clamping probes. The probes 24 are respectively pivoted to the pieces 231 of the probe supporting structure 23. Each probe 24 has a probing end 241. The air outlets 2312 of the air discharge channels 231d and the probing ends 241 are located at the same side of the probe supporting structure 23. The probes 24 can be pivoted with respect to the pieces 231 so as to clamp the electrodes or the temperature detecting gaskets of the batteries B" by the probing ends 241.

As shown in FIG. 3C and FIG. 3D, in this embodiment, ambient gas such as air or nitrogen gas can be guided into the air flow passage 233 via the air inlet (i.e., the vent 2311 of the rightmost or the leftmost piece 231) of the air flow passage 233, and the gas can be discharged from the air outlets 2312 of the air discharge channels 231d. The gas discharged from the air discharge channels 231d can be used to cool the probes 24 and the batteries B". Specifically, by the air flow passage 233, and air discharge channels 231d on the probe supporting structure 23, the alignment of the air outlets 2312 and the probing ends 241 of the probes 24, and the gaps among the electrodes of the batteries B", ambient gas can be guided into the air flow passage 233 and then be discharged from the air outlets 2312 so as to uniformly cool the probes 24 and the batteries B", and thereby improve heat dissipating efficiency.

Furthermore, to prevent the gap from forming between the pieces 231 to cause gas leakage, the battery formation system 2 further includes a plurality of sealing rings 25. Each piece 231 further has an annular groove 231e surrounding one of the vents 2311. The sealing rings 25 are respectively disposed in the annular grooves 231e. The pieces 231 compress the sealing rings 25 when they are assembled on the holder 12.

Figure 4:
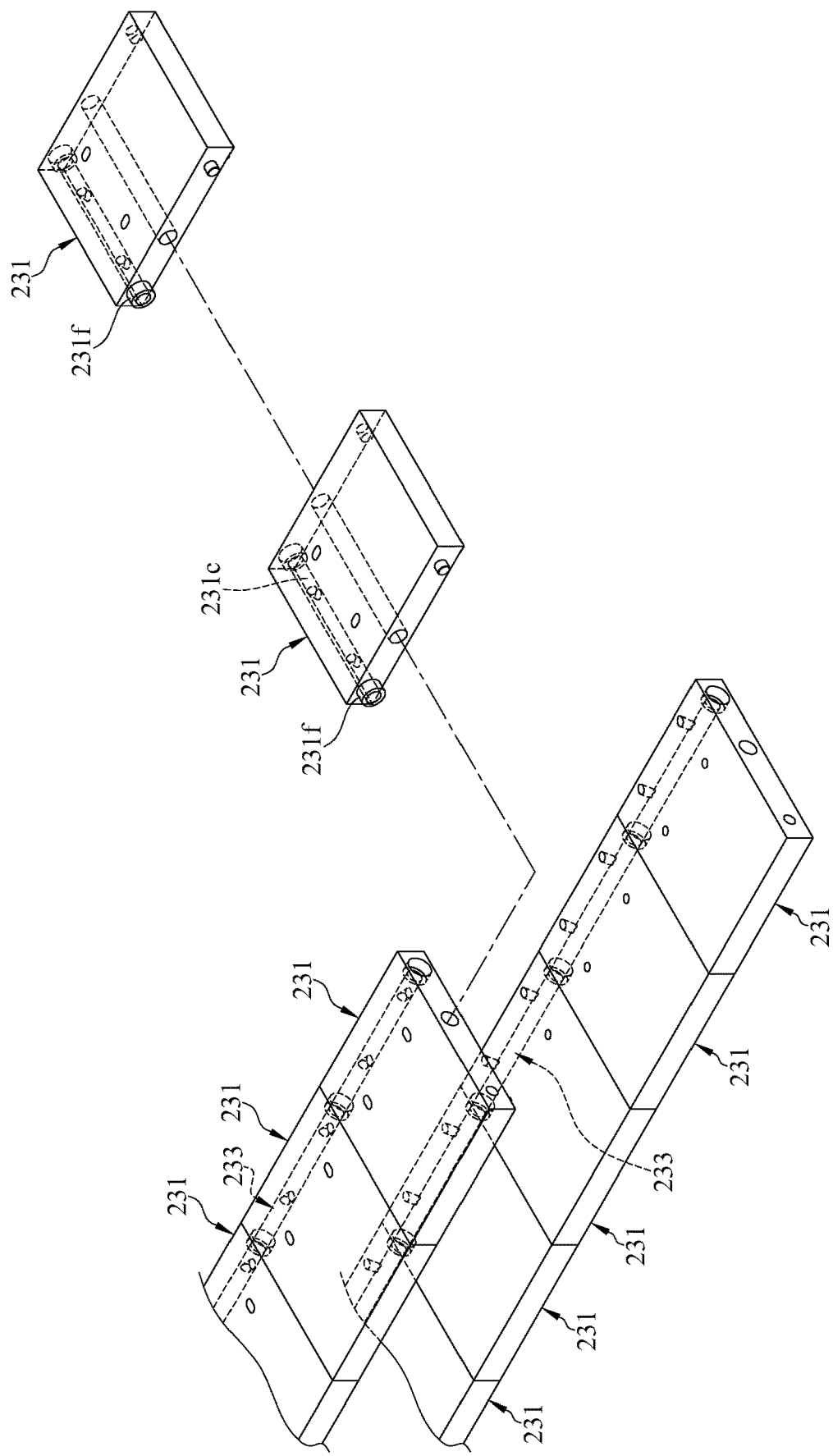
FIG. 4 is a partial exploded view of a probe supporting structure according to a fourth embodiment of the disclosure.

Then, please refer to FIG. 4. FIG. 4 is a partial exploded view of a probe supporting structure of a battery formation system according to a fourth embodiment of the disclosure. Since the similarity of the fourth embodiment and the third embodiment, only the difference between these two embodiments is described below.

In the fourth embodiment, the pieces 231 do not have the annular grooves, each piece 231 has a protruding portion 231f protruding from one of the side surfaces 231a and inserted into the channel segment 231c of the adjacent piece 231. As such, the protruding portions 231f help to prevent gaps from forming between the pieces 231 so as to prevent air from escaping.

Figure 5:
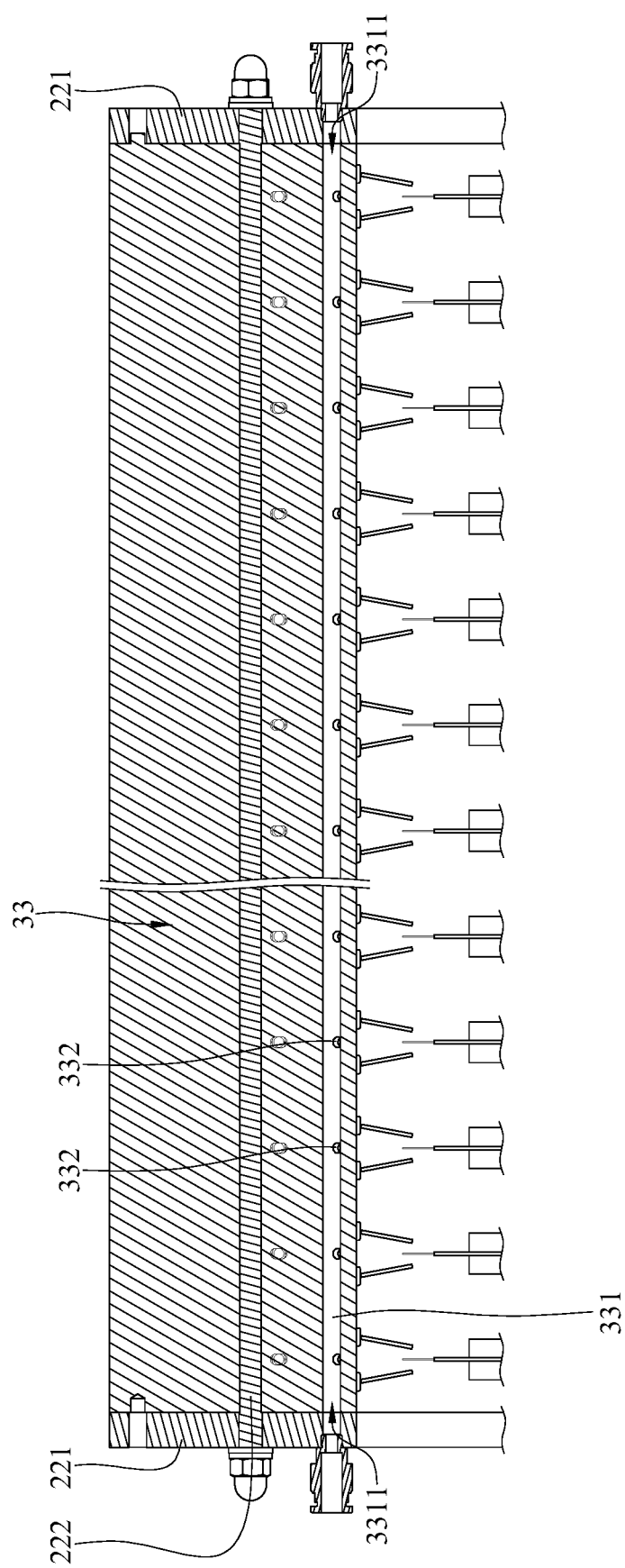
FIG. 5 is a cross-sectional view of a battery formation system according to a fifth embodiment of the disclosure.

Moreover, it is noted that the present disclosure is not limited to the configurations of the probe supporting structures in the previous embodiments. Please refer to FIG. 5. FIG. 5 is a cross-sectional view of a battery formation system according to a fifth embodiment of the disclosure. Since the similarity of the fifth embodiment and the first and third embodiments, only the difference between these embodiments is described below.

This embodiment provides a probe supporting structure 33 which is made of a single piece. The probe supporting structure 33 has an air flow passage 331 and a plurality of air discharge channels 332 which are connected to one another. The air flow passage 331 has two air inlets 3311 respectively located on the two different sides of the probe supporting structure 33.

As the battery formation system and the probe supporting structure discussed above, the probe supporting structure has the air flow passage and the air discharge channels which are connected to one another, thus ambient gas can be guided into the air flow passage, and then be charged from the air outlet of the air discharge channels so as to uniformly cool the probes and the batteries, and thereby improving heat dissipating efficiency.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A battery formation system, comprising:
 a base, adaptive to bear at least one battery;
 a holder, located on one side of the base;
 a probe supporting structure, disposed on the holder, the probe supporting structure having an air flow passage and a plurality of air discharge channels connected to the air flow passage, and an extension direction of the air flow passage intersecting an extension direction of the air discharge channels, wherein the probe supporting structure comprises a plurality of pieces which are assembled together, each of the plurality of pieces has a channel segment, the channel segments are connected to each other so as to form the air flow passage, and at least a part of the plurality of pieces has the air discharge channels; and
 at least one probe, disposed on the probe supporting structure; wherein a probing end of the at least one probe and an air outlet of one of the air discharge channels are located at the same side of the probe supporting structure.

2. The battery formation system according to the claim 1, wherein each of the plurality of pieces further has two side surfaces which are opposite to each other and a bottom surface located between the two side surfaces, each of the channel segments has two vents respectively located on the two side surfaces, and each of the air discharge channels has an air outlet located on the bottom surface, and a connection of the channel segment and the air discharge channel is located between the two vents, and the channel segments are connected via the vents.

3. The battery formation system according to the claim 2, further comprising a plurality of sealing rings, wherein one of the plurality of sealing rings are disposed between two of the plurality of pieces which are adjacent to each other, and the plurality of pieces compress the plurality of sealing rings.

4. The battery formation system according to the claim 2, wherein each of the plurality of pieces further has a protruding portion extending from one of the two side surfaces and inserted into the channel segment of another one of the plurality of piece which is adjacently located thereto.

5. The battery formation system according to the claim 2, further comprising a plurality of sealing rings, wherein the plurality of pieces of the probe supporting structure comprise a plurality of connecting pieces and a plurality of partitioning pieces which are arranged in a staggered manner, the quantity of the at least one probe is plural, the plurality of probes are respectively disposed on the connecting pieces, one of the plurality of sealing rings is disposed between one of the plurality of connecting pieces and one of the plurality of partitioning pieces which are adjacent to each other, and the plurality of connecting pieces and the plurality of partitioning pieces compress the plurality of sealing rings.

6. The battery formation system according to the claim 2, wherein the pieces comprise a plurality of connecting pieces and a plurality of partitioning pieces which are arranged in a staggered manner, the quantity of the at least one probe is plural, the probes are respectively disposed on the plurality of connecting pieces, each of the plurality of partitioning pieces further has two protruding portions respectively extending from the two side surfaces and respectively inserted into the channel segments of two of the plurality of connecting pieces which are adjacently located thereto.

7. A probe supporting structure for battery formation, comprising a plurality of pieces which are assembled together, the probe supporting structure having an air flow passage and a plurality of air discharge channels which are connected to each other, an extension direction of the air flow passage intersecting an extension direction of the air discharge channels, the air flow passage configured to allow gas flowing to the air discharge channels, and an air outlet of each of the air discharge channels configured for the gas to be discharged from the probe supporting structure for cooling at least one battery to be formed;
 wherein each of the plurality of pieces has a channel segment, the channel segments are connected to each other so as to form the air flow passage, and at least a part of the plurality of pieces has the air discharge channels.

8. The probe supporting structure according to the claim 7, wherein each of the plurality of pieces further has two side surfaces which are opposite to each other and a bottom surface which is located between the two side surfaces, each of the plurality of channel segments has two vents respectively located on the two side surfaces, each of the air discharge channels has an air outlet located on the bottom surface, a connection of the channel segment and the air discharge channel is located between the two vents, and the channel segments are connected via the vents.

* * * * *